United States Patent
Kang et al.

(10) Patent No.: US 11,988,849 B2
(45) Date of Patent: May 21, 2024

(54) IMAGING DEVICE AND METHOD

(71) Applicant: Samsung Electronics Co., Ltd., Suwon-si (KR)

(72) Inventors: Deokyoung Kang, Suwon-si (KR); Daekun Yoon, Suwon-si (KR); Yang Ho Cho, Seongnam-si (KR); Dong Kyung Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/957,190

(22) Filed: Sep. 30, 2022

(65) Prior Publication Data

US 2023/0228916 A1 Jul. 20, 2023

(30) Foreign Application Priority Data

Jan. 18, 2022 (KR) .................. 10-2022-0007156

(51) Int. Cl.
| | | |
|---|---|---|
| *G02B 3/00* | (2006.01) | |
| *B60R 11/04* | (2006.01) | |
| *G02B 5/20* | (2006.01) | |
| *G03B 11/00* | (2021.01) | |
| *H04N 23/71* | (2023.01) | |
| *H04N 23/76* | (2023.01) | |
| *H04N 23/84* | (2023.01) | |
| *H04N 25/13* | (2023.01) | |

(52) U.S. Cl.
CPC ............ *G02B 3/0056* (2013.01); *B60R 11/04* (2013.01); *G02B 5/201* (2013.01); *G03B 11/00* (2013.01); *H04N 23/71* (2023.01); *H04N 23/76* (2023.01); *H04N 23/84* (2023.01); *H04N 25/13* (2023.01)

(58) Field of Classification Search
CPC ....... G02B 3/0056; G02B 5/201; B60R 11/04; G03B 11/00; H04N 23/71; H04N 23/76; H04N 23/84; H04N 25/13; H04N 25/134; H04N 25/46; H01L 27/14621; H01L 27/14627
See application file for complete search history.

(56) References Cited

U.S. PATENT DOCUMENTS

| | | | | |
|---|---|---|---|---|
| 6,977,685 | B1 * | 12/2005 | Acosta-Serafini | ..... H04N 25/00 348/297 |
| 7,154,075 | B2 | 12/2006 | Krymski | |
| 10,902,557 | B2 | 1/2021 | Cho et al. | |
| 11,057,577 | B2 * | 7/2021 | Kang | ............. H04N 23/631 |
| 11,350,048 | B1 * | 5/2022 | Magnani | ............. H04N 25/75 |
| 11,523,071 | B1 * | 12/2022 | Powell | ............. H04N 25/76 |

(Continued)

FOREIGN PATENT DOCUMENTS

| | | | |
|---|---|---|---|
| KR | 10-0781552 B1 | 12/2007 | |
| KR | 10-0827238 B1 | 5/2008 | |

(Continued)

*Primary Examiner* — Chiawei Chen
(74) *Attorney, Agent, or Firm* — NSIP Law

(57) ABSTRACT

An imaging device is provided. The imaging device may sense light passing through a corresponding imaging lens and a corresponding color filter in sensing elements disposed in a sensing region for each color channel, and generate sensing data based on a grouping of color intensity values sensed by the sensing elements for each sensing region based on a binning size determined based on an illuminance of light.

26 Claims, 10 Drawing Sheets

(56) References Cited

U.S. PATENT DOCUMENTS

| | | | |
|---|---|---|---|
| 11,606,517 B1* | 3/2023 | Sharma | G01S 7/4816 |
| 2005/0012968 A1* | 1/2005 | McCaffrey | H04N 3/155 |
| | | | 348/E3.018 |
| 2008/0062290 A1* | 3/2008 | Lahav | H04N 25/778 |
| | | | 348/E9.01 |
| 2011/0013040 A1* | 1/2011 | Han | H04N 25/771 |
| | | | 348/222.1 |
| 2018/0220101 A1* | 8/2018 | Evans | G09G 5/02 |
| 2021/0120253 A1* | 4/2021 | Topiwala | H04N 19/186 |
| 2022/0124264 A1* | 4/2022 | Jang | H04N 25/702 |
| 2022/0182589 A1* | 6/2022 | Sun | G06T 5/50 |
| 2023/0171515 A1* | 6/2023 | Kim | H04N 25/42 |
| | | | 348/216.1 |

FOREIGN PATENT DOCUMENTS

| | | |
|---|---|---|
| KR | 10-0827242 B1 | 5/2008 |
| KR | 10-1531709 B1 | 7/2015 |
| KR | 10-1597785 B1 | 2/2016 |
| KR | 10-2017-0025807 A | 3/2017 |
| KR | 10-1811637 B1 | 12/2017 |

\* cited by examiner

IMAGING DEVICE AND METHOD

CROSS-REFERENCE TO RELATED APPLICATIONS

This application claims the benefit under 35 USC § 119(a) of Korean Patent Application No. 10-2022-0007156, filed on Jan. 18, 2022, in the Korean Intellectual Property Office, the entire disclosure of which is incorporated herein by reference for all purposes.

BACKGROUND

1. Field

The following description relates to an image sensor and an imaging device.

2. Description of Related Art

In view of the development of optical technology and image processing technology, image capturing devices are utilized in a wide variety of fields such as, but not limited to, fields related to multimedia content, security, and recognition. For example, an image capturing device may be mounted on a mobile device, a camera, a vehicle, or a computer to capture an image, recognize an object, or obtain data to control a device. The volume of the image capturing device may be determined based on the size of a lens, the focal length of the lens, and the size of a sensor. When the size of the lens decreases, the focal length of the lens may also decrease. Accordingly, multiple lenses including small lenses may be implemented to reduce the volume of the capturing device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an imaging device includes an image sensor, comprising a color filter array comprising a first color filter configured to pass light of a first wavelength corresponding to a first color among light passing through a first imaging lens, a second color filter configured to pass light of a second wavelength corresponding to a second color among light passing through a second imaging lens, and a third color filter configured to pass light of a third wavelength corresponding to a third color among light passing through a third imaging lens; a sensing array comprising first sensing elements disposed in a first color sensing region configured to receive light passing through the first color filter, second sensing elements disposed in a second color sensing region configured to receive light passing through the second color filter, and third sensing elements disposed in a third color sensing region configured to receive light passing through the third color filter; and a controller configured to group the first sensing elements, the second sensing elements, and the third sensing elements based on a binning size determined based on an illuminance, and generate sensing data based on a sensing of the grouped first sensing elements, a sensing of the grouped second sensing elements, and a sensing of the grouped third sensing elements.

The imaging device may further include a processor configured to reconstruct a captured image from the generated sensing data, wherein the generated sensing data comprises sensing intensity values summed based on a binning for each pixel.

The processor may be configured to rearrange pixel values sensed by sensing elements that receive light emitted from a same point or adjacent points on a subject to dispose the pixel values in pixel positions adjacent to each other.

The processor may be further configured to generate a channel image with a target resolution from the rearranged pixel values.

The controller may be further configured to select one binning size from among three or more binning sizes based on the illuminance.

The controller may be further configured to determine each pixel value based on a sensing value sensed by an individual sensing element in response to the illuminance exceeding a threshold illuminance.

The controller may be further configured to bin a first total number of sensing elements of the first sensing elements, the second sensing elements, and the third sensing elements in response to the illuminance being less than or equal to a first illuminance and exceeding a second illuminance; and bin a second total number of sensing elements of the first sensing elements, the second sensing elements, and the third sensing elements greater than the first total number of sensing elements in response to the illuminance being less than or equal to the second illuminance.

Sensing elements of the first sensing elements, the second sensing elements, and the third sensing elements greater than 50% of a plurality of sensing elements covered by each imaging lens may be disposed to receive light of a wavelength corresponding to a same single color.

The first color, the second color, and the third color may be comprised in a same color system, and are different from each other.

The sensing array may include at least one color sensing region for each color of a color system.

The imaging device may further include a plurality of imaging lenses in an image lens array, where the plurality of imaging lenses include the first imaging lens, the second imaging lens, and the third imaging lens.

The imaging device may be a multi-lens camera.

A total number of sensing elements that sense green in the sensing array may be greater than or equal to a total number of sensing elements in the sensing array that sense other colors.

The color filter array may further include an additional color filter in which a pattern comprising one red pass filtering element, one blue pass filtering element, and two green pass filtering elements is repeatedly disposed, and the sensing array may further include a plurality of additional sensing elements corresponding to the additional color filter, and configured to sense light passing through an additional imaging lens and the additional color filter.

The pattern may be a Bayer pattern.

The controller may be further configured to skip a binning operation for each of the additional sensing elements.

The imaging device may further include a processor configured to rearrange pixels sensed by the first sensing elements, the second sensing elements, and the third sensing elements based on data sensed by each of the plurality of additional sensing elements.

A total number of sensing regions corresponding to green may be greater than or equal to a total number of sensing regions corresponding to blue or a total number of sensing regions corresponding to red.

The imaging device may further include an illuminance sensor configured to measure the illuminance.

In a general aspect, an imaging device includes an imaging lens array comprising a first imaging lens, a second imaging lens, and a third imaging lens; a color filter array comprising a first color filter configured to pass light of a first wavelength corresponding to a first color among light passing through the first imaging lens, a second color filter configured to pass light of a second wavelength corresponding to a second color among light passing through the second imaging lens, and a third color filter configured to pass light of a third wavelength corresponding to a third color among light passing through the third imaging lens; a sensing array comprising first sensing elements disposed in a first color sensing region configured to receive light passing through the first color filter, second sensing elements disposed in a second color sensing region configured to receive light passing through the second color filter, and third sensing elements disposed in a third color sensing region configured to receive light passing through the third color filter; and a controller configured to group the first sensing elements, the second sensing elements, and the third sensing elements based on a binning size determined based on an illuminance, and generate sensing data based on a sensing of the grouped first sensing elements, a sensing of the grouped second sensing elements, and a sensing of the grouped third sensing elements.

In a general aspect, a method includes sensing, by an image sensor, light passing through a color filter and an imaging lens corresponding to the color filter by sensing elements disposed in a sensing region for respective color channels; and generating sensing data based on a grouping of color intensity values sensed by the sensing elements for each sensing region based on a binning size determined based on an illuminance of light.

In a general aspect, a multi-lens camera, include a plurality of imaging lens; an optical filter comprising a plurality of color filters, each configured to receive light passing through a corresponding imaging lens, and transmit light corresponding to a single color; a sensing array configured to generate sensing information based on the light passing through the imaging lens, and a controller configured to determine an illuminance level of a capturing environment based on the light passing through the imaging lens, and select a binning size corresponding to the determined illuminance level from among a plurality of binning sizes, and reconstruct a captured image based on the sensing information.

The sensing information may include at least one of intensity information and color intensity values.

The illuminance level of the capturing environment may be determined from at least one of a high illuminance, a first low illuminance level, a second low illuminance level, and a third low illuminance level.

Other features and aspects will be apparent from the following detailed description, the drawings, and the claims.

Figure 1:
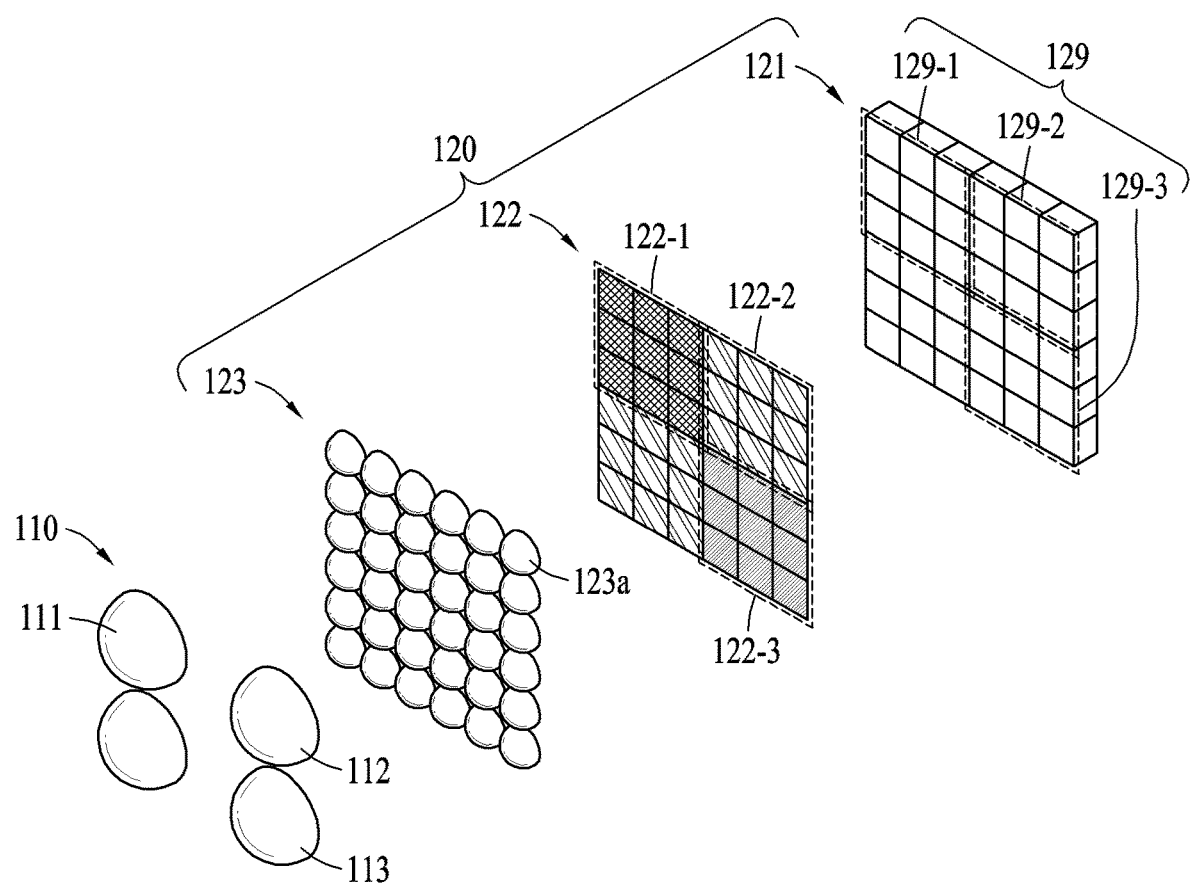
FIG. 1 illustrates example structures of an example imaging device, in accordance with one or more embodiments.

Throughout the drawings and the detailed description, unless otherwise described or provided, the same drawing reference numerals will be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains after an understanding of the disclosure of the present application. Terms, such as those defined in commonly used dictionaries in the context of this art, are to be interpreted as having a meaning that is consistent with their meaning in the context of the relevant art and the disclosure of the present application, and are not to be interpreted in an idealized or overly formal sense unless expressly so defined herein.

Figure 2:
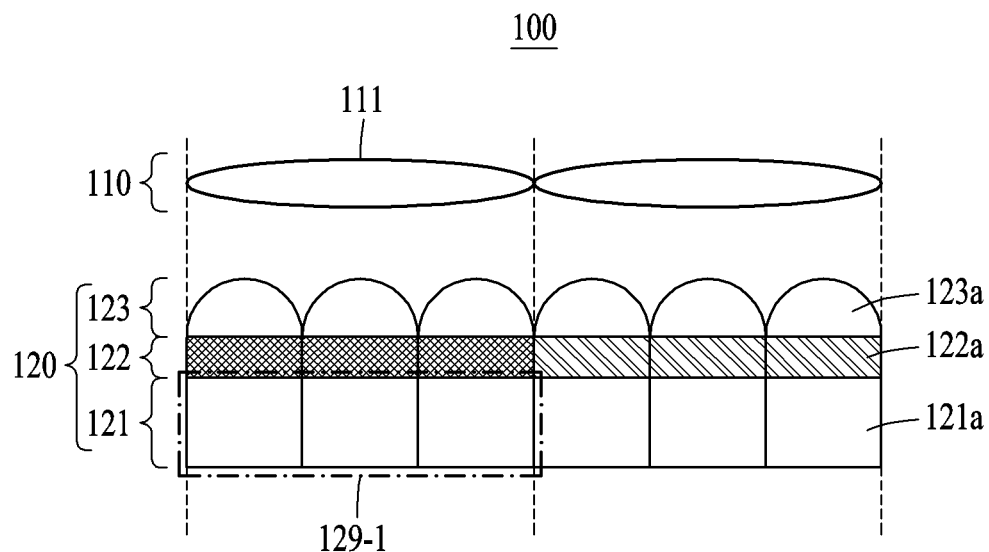
FIG. 2 illustrates example structures of an example imaging device, in accordance with one or more embodiments.

FIGS. 1 and 2 illustrate example structures of an example imaging device, in accordance with one or more embodiments. FIG. 1 is a perspective view of an example imaging device, and FIG. 2 is a cross-cross-sectional view of the example imaging device.

An imaging device 100 may include a lens array 110 and an image sensor 120. The lens array 110 may include lens elements, and the image sensor 120 may include optical sensing elements. The lens elements of the lens array 110 may be disposed along a plane of the lens array 110, and the optical sensing elements of the image sensor 120 may be disposed along a plane of a sensing array 121 in the image sensor 120. In an example, the plane of the lens array 110 may be parallel with a plane of the sensing array 121. In a non-limiting example, the lens array 110 may be a multi-lens array (MLA) that performs an imaging operation and may also be referred to as an "imaging lens array".

In one or more examples, an optical sensing element (hereinafter, referred to as a "sensing element") may be an element that senses optical information based on light incident on the element, and may output a value indicating an intensity of the incident light. The optical sensing element may include, as only non-limiting examples, a complementary metal-oxide-semiconductor (CMOS), a charge-coupled device (CCD), and a photodiode.

In an example, a picture element (hereinafter, referred to as a "pixel") may be basic unit information making up an image, and light reflected from a physical position on a subject corresponding to a pixel position may represent optical information sensed by a sensing element. The pixel position may a position of a pixel in an image and may follow a pixel coordinate system, and the physical position may follow a world coordinate system. In an example, the world coordinate system may be a continuous spatial coordinate system that may specify the location of a physical object in images independently of the respective pixel indices of the one or more images.

In an example, a pixel making up a color image may have a pixel value for a single pixel position. A pixel value may have a plurality of color values (e.g., a red value, a green value, and a blue value in an RGB color system). In a display field, a unit pixel making up a display may include sub-pixels (e.g., a red sub-pixel, a green sub-pixel, and a blue sub-pixel in an RGB color system) related to a plurality of colors to express color values of one pixel position. In an image sensor field, generally, a pixel may refer to a sensing element (e.g., a photodiode in which a color filter is disposed in front) that senses one color value, instead of being divided into sub-pixels for each color. Additionally, in the image sensor field, a pixel may also refer to one sensing element and a value sensed by the sensing element. However, in the one or more examples, for clarity, a pixel may be basic unit information making up an image, and a sensing element may be a hardware element that outputs a pixel value of a corresponding pixel in response to light being received from a subject.

In an example, a pixel value of each pixel may be determined based on the sensing of a single sensing element, or the sensing of a plurality of sensing elements grouped by binning. Binning may refer to the combining of electrical charges of adjacent pixels to form a superpixel. The combined signal may then be amplified and converted into digital values by an analog-to-digital converter. By performing a binning process, the photosensitivity of the imaging device 100 and/or the image sensor 120 of the imaging device 100, may be enhanced, and image quality may be increased even in a low illuminance. There is a limitation to an amount of light that may be sensed by a single sensing element, and sensitivity may be enhanced by representing one pixel using values sensed by a plurality of sensing elements. The image sensor 120 may group sensing elements of the sensing array 121 based on a binning size determined based on an illuminance. A pixel value of one pixel may be determined based on a value obtained by summing intensity values sensed by the sensing elements grouped based on the above-described binning size. An example of determination and grouping of pixels using a binning size based on the illuminance will be described with reference to FIG. 4 below.

In a non-limiting example, the image sensor 120 may include the sensing array 121, an optical filter 122 (e.g., a color filter array), and a condensing lens array 123. However, examples are not limited thereto, and the optical filter 122 may also be implemented integrally with the condensing lens array 123 including an individual condensing microlens 123a that has an optical characteristic of passing a predetermined wavelength band and blocking the remaining wavelength bands.

The condensing lens array 123 may include a plurality of condensing microlenses 123a to concentrate light passing through the lens array 110 to the sensing array 121. In an example, a total number of condensing microlenses 123a included in the condensing lens array 123 may be equal to a total number of sensing elements included in the sensing array 121. In an example, the plurality of condensing microlenses 123a may be disposed between imaging optical lenses 110 and the sensing array 121 and may transmit light passing through the imaging optical lenses to sensing elements 121a corresponding to respective condensing microlenses 123a by concentrating the light in the sensing elements 121a. In an example, as illustrated in FIG. 2, a condensing microlens 123a may be disposed on each sensing element 121a of the sensing array 121 to concentrate light in the sensing element 121a disposed thereunder. Further, as illustrated in FIG. 2, a color pass filtering element 122a may be disposed between each condensing microlens 123a and each corresponding sensing element 121a.

The optical filter 122 may be a filter that has an optical characteristic of passing a predetermined wavelength band and blocking the remaining wavelength bands. In an example, the optical filter 122 may include one or more color filters. Each color filter may receive light passing through a corresponding imaging lens and transmit light corresponding to a wavelength of a single color (e.g., one of red, blue and green) among the received light. In an example, the optical filter 122 may be implemented as a color filter array (CFA) including a plurality of color filters 122-1, 122-2, and 122-3 disposed along a filter plane. Each color filter may include one or more color pass filtering elements 122a. A color filter may be a set of a plurality of color pass filtering elements or a color pass filtering element having an area covering a sensing region. Each color pass filtering element 122a may be a filter that passes light of a specific wavelength band corresponding to a predetermined color, and blocks light of the remaining bands. Each color pass filtering element 122a may include, for example, a red pass filtering element, a green pass filtering element, and a blue pass filtering element. The red pass filtering element may pass light of a wavelength band corresponding to red and block light of the remaining bands, for example, the green and blue bands. The green pass filtering element may pass light of a wavelength band corresponding to green and block light of the remaining bands, for example, the red and blue bands. The blue pass filtering element may pass light of a wavelength band corresponding to blue and block light of the remaining bands, for example, the red and green bands.

A quality of an image captured and reconstructed by the image sensor 120 may be determined based on the total number of sensing elements included in the sensing array 121 and an amount of light incident on the respective sensing elements 121a. In an example, a resolution of an image may be determined based on the total number of sensing elements included in the sensing array 121, a sensitivity of the image may be determined based on an amount of light incident on the respective sensing elements 121a, and the amount of incident light may be determined based on the size of the sensing elements 121a or a binning size. As the size of the sensing elements 121a or the binning size increases, the amount of incident light may increase, and a dynamic range of the sensing array 121 may increase. Thus, as the total number of sensing elements included in the sensing array 121 increases, a resolution of an image captured by the image sensor 120 may increase. In response to an increase in the size of the sensing elements 121a and/or the binning size, the image sensor 120 may advantageously operate to capture an image having a high sensitivity in a low illuminance.

In an example, the lens array 110 may include one or more imaging lenses 111, 112, and 113, and each of the imaging lenses 111, 112, and 113, may respectively correspond to a single color. FIG. 1 illustrates a first imaging lens 111 which may correspond to a first color (e.g., red), a second imaging lens 112 which may correspond to a second color (e.g., green), and a third imaging lens 113 which may correspond to a third color (e.g., blue). Each of the first imaging lens 111 through the third imaging lens 113 of the lens array 110 may cover sensing regions 129 of the sensing array 121 corresponding to a lens size thereof. The sensing regions 129 of the sensing array 121 covered by each of the first imaging lens 111 through the third imaging lens 113 may be determined based on lens specifications (e.g., a size, a curvature, or a thickness) of a corresponding imaging lens. The sensing regions 129 may be regions of the sensing array 121 that rays of a predetermined range of a field of view (FoV) passing through a corresponding imaging lens arrive. A size of each of the sensing regions 129 may be expressed as a distance or a diagonal length from a center of a corresponding sensing region to an outermost point of the sensing region. In other words, light passing through a corresponding imaging lens may be incident on respective sensing elements included in each of the sensing regions 129. In an example, the sensing regions 129 may include a first color sensing region 129-1, a second color sensing region 129-2, and a third color sensing region 129-3. Information sensed in each of the sensing regions 129 will be described below.

Each of the sensing elements in the sensing array 121 may generate sensing information based on rays passing through the first imaging lens 111 through the third imaging lens 113 of the lens array 110. In an example, the sensing element 121a may sense an intensity value of light received through an imaging lens as the sensing information. The imaging device 100 and/or the image sensor 120 may determine intensity information corresponding to an original signal related to points included in the FoV of the imaging device 100 based on the sensing information output from the sensing array 121. The imaging device 100 and/or the image sensor 120 may reconstruct a captured image based on the determined intensity information. Additionally, the sensing element 121a of the sensing array 121 may generate a color intensity value corresponding to a desired color as the sensing information by sensing light passing through the color pass filtering element 122a. Each of the plurality of sensing elements 121a in the sensing array 121 may be disposed to sense light of a specific color wavelength designated for each of the sensing regions 129. The sensing array 121 may sense an intensity of light passing through a color filter and an imaging lens of a corresponding single color, using sensing elements disposed in a color sensing region corresponding to each single color among a plurality of colors.

In an example, the image sensor 120 may obtain a partial image from sensing information of sensing elements 121a that sense light passing through each of the plurality of imaging lenses 111, 112, and 113. Sensing elements 121a that are configured to receive light of a specific color, and that are covered by one imaging lens in the image sensor 120, may receive light passing through the same color filter. Accordingly, sensing elements included in a sensing region corresponding to one imaging lens may sense light of a wavelength band corresponding to the same color. In an example, sensing elements exceeding 50% of a plurality of sensing elements covered by each imaging lens may be disposed to receive light of a wavelength corresponding to the same single color. In an example, sensing elements exceeding 90% of the plurality of sensing elements covered by each imaging lens may be disposed to receive light of a wavelength corresponding to the same single color. Additionally, light of a color wavelength band that has to be transferred to a neighboring sensing region may be transferred to another sensing region due to an error in a manufacturing process, for example. The imaging device 100 and/or the image sensor 120 may exclude a value sensed by a sensing element that receives light of a different color due to an error in a manufacturing process among sensing elements disposed in a color sensing region corresponding to one color from sensing data of the color sensing element. Thus, the imaging device 100 and/or the image sensor 120 may obtain pixel values of the same color for one color sensing region.

A partial image may be segmented images that are obtained by different red, green, and blue color channels representing a scene corresponding to a FoV range of a corresponding imaging lens. The partial image may be an image including pixel values of a corresponding color channel, for example, a red channel, a green channel, and a blue channel. Based on an arrangement of a plurality of color filters in the color filter array 122, a color that may be sensed in each sensing region may be determined. The image sensor 120 may capture a partial image of a color channel that may be sensed in a sensing region corresponding to each imaging lens. In other words, the image sensor 120 may obtain the same total number of partial images as the total number of imaging lenses (e.g., the first imaging lens 111 through the third imaging lens 113). The image sensor 120 may obtain one or more partial images for each of a plurality of color channels. The image sensor 120 may receive one or more partial images for a red channel, one or more partial images for a green channel, and one or more partial images for a blue channel. A set of partial images may also be referred to as a "compound eye vision (CEV) image".

A partial image may have a resolution that is based on a total number of sensing elements covered by an imaging lens and a binning size. A resolution of a partial image may also be referred to as a "partial resolution." In the one or more examples, a resolution and a partial resolution may be a total number of pixels making up an image. The image sensor 120 and/or the imaging device 100 may reconstruct a captured image that has a target resolution (e.g., a full resolution) based on partial images of the captured image. The full resolution may be determined based on a total number of sensing elements included in the image sensor 120 and the binning size.

In an example, the lens array 110 may include the first imaging lens 111, the second imaging lens 112, and the third imaging lens 113. The color filter array 122 may include a first color filter 122-1, a second color filter 122-2, and a third color filter 122-3. The sensing elements included in the sensing array 121 may be classified by the first color sensing region 129-1, the second color sensing region 129-2, and the third color sensing region 129-3.

In a non-limiting example, the first color filter 122-1 may pass light of a wavelength corresponding to the first color (e.g., red) among light passing through the first imaging lens 111. First sensing elements disposed in the first color sensing region 129-1 may receive the light passing through the first imaging lens 111 and the first color filter 122-1. The first sensing elements disposed in the first color sensing region 129-1 may sense a light component of a wavelength band corresponding to the first color among rays within a FoV range of the first imaging lens 111. Sensing information sensed by the first sensing elements may include intensity information, corresponding to the first color, associated with a scene corresponding to the FoV range of the first imaging lens 111.

The second color filter 122-2 may pass light of a wavelength corresponding to the second color (e.g., green) among light passing through the second imaging lens 112. Second sensing elements disposed in the second color sensing region 129-2 may receive the light passing through the second imaging lens 112 and the second color filter 122-2. The second sensing elements disposed in the second color sensing region 129-2 may sense a light component of a wavelength band corresponding to the second color among rays within a FoV range of the second imaging lens 112. Sensing information sensed by the second sensing elements may include intensity information, corresponding to the second color, associated with a scene corresponding to the FoV range of the second imaging lens 112.

The third color filter 122-3 may pass light of a wavelength corresponding to a third color (e.g., blue) among light passing through the third imaging lens 113. Third sensing elements disposed in the third color sensing region 129-3 may receive light passing through the third imaging lens 113 and the third color filter 122-3. The third sensing elements disposed in the third color sensing region 129-3 may sense a light component of a wavelength band corresponding to the third color among rays within a FoV range of the third imaging lens 113. Sensing information sensed by the third sensing elements may include intensity information, corresponding to the third color, associated with a scene corresponding to the FoV range of the third imaging lens 113.

In an example, a controller (e.g., a controller 829 of FIG. 8) may group sensing elements disposed in each color sensing region based on a binning size determined based on an illuminance. The controller may group the first sensing elements 129-1, the second sensing elements 129-2, and the third sensing elements 129-3 based on a binning size determined based on an illuminance. The controller may generate sensing data based on a sensing of the grouped first sensing elements 129-1, the grouped second sensing elements 129-2, and the grouped third sensing elements 129-3. The controller may generate sensing data based on an intensity of light sensed by the respective grouped sensing elements 129-1, 129-2, and 129-3. The sensing data may include a partial image for each sensing region and/or intensity information for the partial image. The image sensor 120 may obtain a partial image of a captured image (e.g., a red channel partial image) corresponding to a channel of the first color with a first partial resolution (e.g., a low resolution) determined based on a total number of first sensing elements and the binning size from the sensing information sensed by the first sensing elements. The image sensor 120 may receive a partial image of the captured image (e.g., a green channel partial image) corresponding to a channel of the second color with a second partial resolution (e.g., a low resolution) determined based on a total number of second sensing elements and the binning size from the sensing information sensed by the second sensing elements. The image sensor 120 may obtain a partial image of the captured image (e.g., a blue channel partial image) corresponding to a channel of the third color with a third partial resolution (e.g., a low resolution) determined based on a total number of third sensing elements and the binning size from the sensing information sensed by the third sensing elements.

In a non-limiting example, as illustrated in FIG. 1, the filter 122 may include one first color filter 122-1, two second color filters 122-2, one third color filter 122-3, one first color sensing region 129-1, two second color sensing regions 129-2, and one third color sensing region 129-3. In the example illustrated in FIG. 1, the image sensor 120 and/or the imaging device 100 may receive one red channel partial image, two green channel partial images, and one blue channel partial image. However, the examples are not limited thereto, and a total number of color filters and a total number of color sensing regions may be one or at least two. Additionally, a three-dimensional (3D) color system (e.g., an RGB color space) is mainly described herein. However, the examples are not limited thereto and may also be applicable to an n-dimensional color system. Here, "n" may be an integer greater than or equal to "4". The image sensor 120 for the n-dimensional color system may further include an i-th color filter, an i-th color sensing region, and an i-th imaging lens for an i-th color included in the n-dimensional color system. In an example, i denotes an integer greater than or equal to "4" and less than or equal to "n". The imaging device 100 may also be referred to as a "camera device", as only an example.

Accordingly, the imaging device 100 may acquire low-resolution input images for each color through a variety of sensing information obtained as described above, and reconstruct a higher-resolution output image from the low-resolution input images. The imaging device 100 and/or the image sensor 120 may obtain an image optimized for a corresponding illuminance by adjusting a binning factor (e.g., a binning size) for each illuminance. In the imaging device 100 and/or the image sensor 120, binning sizes may be set for each of at least three illuminance levels without a limitation. The imaging device 100 and/or the image sensor 120 may obtain an image with a low image quality loss by obtaining a captured image having a uniform color distribution after image registration.

An example method of operating the image sensor 120 that performs a dynamic binning, will be described below with reference to FIG. 3.

Figure 3:
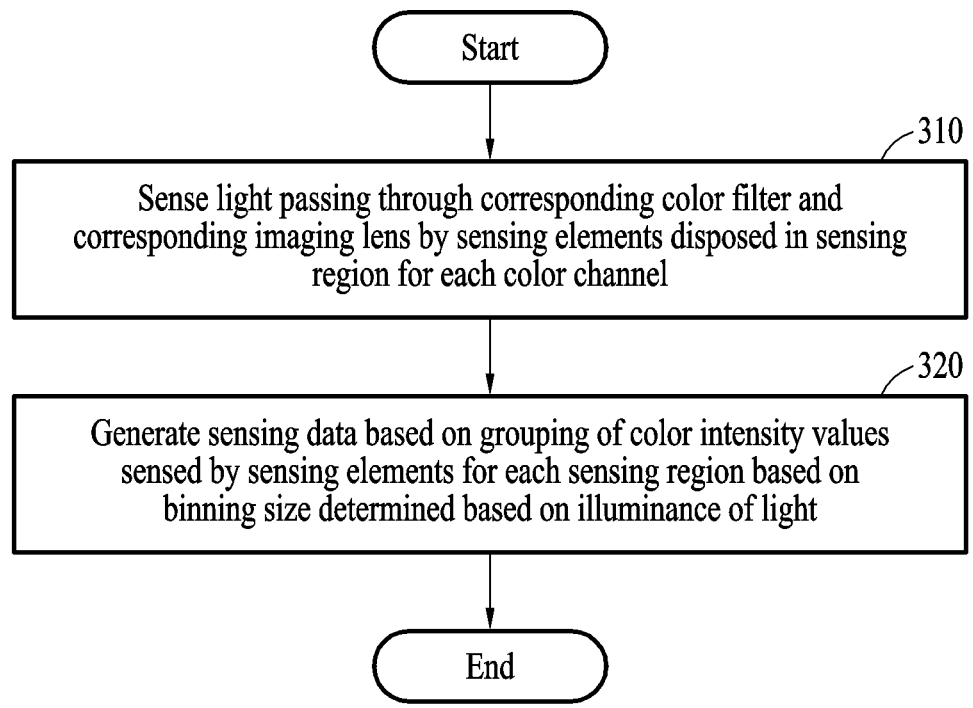
FIG. 3 is a flowchart illustrating an example operating method of an example image sensor.

FIG. 3 is a flowchart illustrating an example method of operating an image sensor, in accordance with one or more embodiments. The operations in FIG. 3 may be performed in the sequence and manner as shown. However, the order of some operations may be changed, or some of the operations may be omitted, without departing from the spirit and scope of the shown example. Additionally, operations illustrated in FIG. 3 may be performed in parallel or simultaneously. One or more blocks of FIG. 3, and combinations of the blocks, can be implemented by special purpose hardware-based computer that perform the specified functions, or combinations of special purpose hardware and instructions, e.g., computer or processor instructions. In addition to the description of FIG. 3 below, the descriptions of FIGS. 1-2 are also applicable to FIG. 3, and are incorporated herein by reference. Thus, the above description may not be repeated here for brevity purposes. The operations of FIG. 3 may be performed by a processor.

In operation 310, the image sensor may sense light passing through a corresponding imaging lens and a corresponding color filter in sensing elements disposed in a sensing region for each color channel. As described above, a sensing array may include a sensing region corresponding to each color channel. In an example, an image sensor that is implemented for an RGB color system, may include at least one first color sensing region corresponding to a red channel, at least one second color sensing region corresponding to a green channel, and at least one third color sensing region corresponding to a blue channel.

In operation 320, the image sensor may generate sensing data based on the grouping of color intensity values sensed by sensing elements for each sensing region based on a binning size determined based on an illuminance of light. A color intensity value may indicate an intensity of light of a wavelength band corresponding to a color that may be sensed in a corresponding sensing region among light transferred to the sensing region. As described above, a sensing element disposed in each color sensing region may sense a light component corresponding to a color of a color filter corresponding to a corresponding color sensing region. The sensing data may include sensing values summed based on binning for each pixel. For example, the image sensor may obtain sensing information corresponding to individual pixels by summing intensity values (e.g., color intensity values) sensed by one or more sensing elements grouped based on a binning size. The image sensor may perform analog binning of summing analog sensing signals sensed by sensing elements grouped with respect to one pixel, and/or digital binning of summing digital sensing values sensed by sensing elements grouped with respect to one pixel. The analog binning may be performed, for example, in an amplifier stage. The sensing data may include sensing values (e.g., color values) corresponding to pixels included in a partial image for each color channel corresponding to a corresponding color, for each color sensing region. However, the sensing data is not limited to the above-described sensing data and may vary depending on a design.

In an example, a processor of the image sensor may reconstruct an image (e.g., a captured image) from the sensing data. The image sensor may obtain a plurality of partial images having a low resolution by determining a pixel value of an individual pixel based on the above-described sensing data, and may reconstruct a captured image with a target resolution (e.g., a full resolution) from the plurality of partial images. An example of image reconstruction by the processor will be described below with reference to FIG. 5. However, although the image sensor mainly operates herein, the examples are not limited thereto, and an operation may also be performed by the processor of the imaging device.

Figure 4:
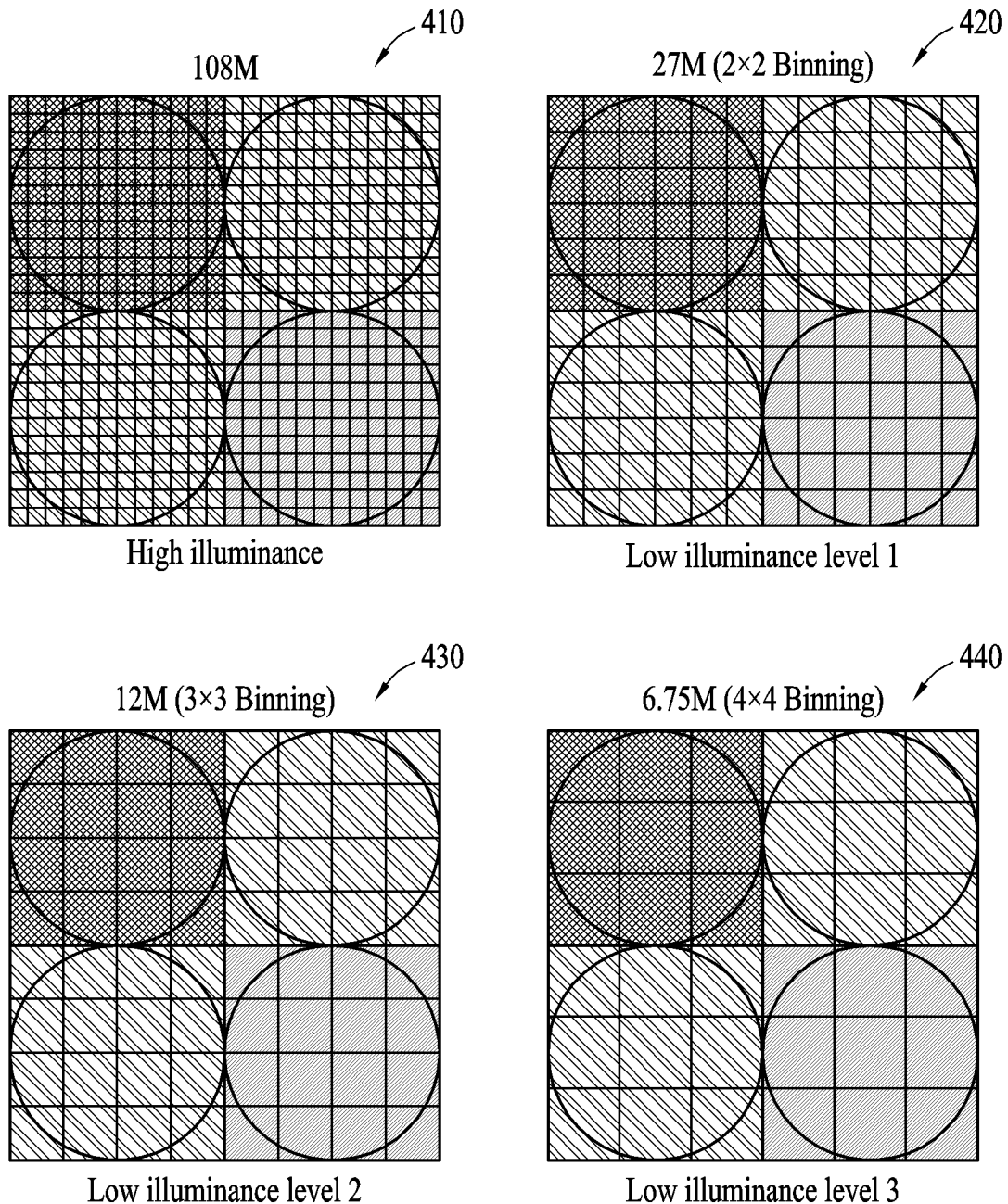
FIG. 4 illustrates an example binning operation of an example image sensor, in accordance with one or more embodiments.

FIG. 4 illustrates an example binning operation of an example image sensor, in accordance with one or more embodiments.

In an example, a controller (e.g., the controller 829 of FIG. 8) of the image sensor may select one binning size from among at least three binning sizes (e.g., 1×1, 2×2, 3×3, and 4×4) based on an illuminance. A binning size may be expressed by a product of a total number of sensing elements grouped along one axis (e.g., a horizontal axis) in a sensing array and a total number of sensing elements grouped along another axis (e.g., a vertical axis) intersecting the aforementioned axis, however, the examples are not limited thereto. In an example, the image sensor and/or an imaging device may designate an illuminance range for each of a plurality of illuminance levels and identify an illuminance level corresponding to an illuminance range to which an illuminance value detected with respect to a surrounding environment belongs. The image sensor and/or the imaging device may select a binning size corresponding to the identified illuminance level from among a plurality of binning sizes.

In one or more examples, the imaging device and/or the image sensor may further include a separate illuminance sensor, and may determine a binning size based on an illuminance value sensed by the illuminance sensor. However, the examples are not limited thereto, and the imaging device and/or the image sensor may monitor an amount of light sensed by sensing elements in the sensing array and determine an illuminance level based on the monitored amount of light.

In the example shown in FIG. 4, the controller may determine an illuminance level of a capturing environment to be one of four illuminance levels that include a high illuminance 410, a first low illuminance level 1 420, a second low illuminance level 2 430, and a third low illuminance level 3 440. Although four illuminance levels are discussed herein, this is only an example, and illuminance levels less than or greater than four may be considered. As described above, the full resolution and the partial resolution may be determined based on the number of sensing elements and the binning size. For example, in a sensing array including "$N_p$" sensing elements, a full-resolution image having "$N_p/b^2$" pixels for a b×b binning size may be obtained. If a number of sensing regions in the sensing array is $N_s$, a resolution of a partial image may be $(N_p/b^2)/N_s$. In an example, $N_p$, b, and $N_s$ may each be an integer greater than or equal to "1".

In an environment of the high illuminance 410, the image sensor may select a binning size (e.g., 1×1) corresponding to the high illuminance 410. The high illuminance 410 may indicate an environment in which a measured illuminance exceeds a threshold illuminance. For example, when an illuminance exceeds the threshold illuminance, the controller may determine each pixel value based on a sensing value sensed by an individual sensing element. In the example illustrated in FIG. 4, if binning is skipped in the high illuminance 410, the image sensor may obtain sensing data of "108" megapixels (MP). In an example in which the sensing array is divided into four color sensing regions, the image sensor may obtain four partial images of the captured image corresponding to the total number of sensing regions. A partial image for each sensing region may have a resolution of 27 MP (=108 MP/4).

In another example, when the illuminance is less than or equal to a first illuminance and exceeds a second illuminance (e.g., the low illuminance level 1 420), the controller of the image sensor may bin a first total number of sensing elements. When the illuminance is less than or equal to the second illuminance (e.g., the low illuminance level 2 430 or the low illuminance level 3 440), the controller may bin a second total number of sensing elements greater than the first number of sensing elements. For example, in the example illustrated in FIG. 4, the controller may determine a binning size to be "2×2" in the first low illuminance level 1 420. By performing 2×2 binning, the controller may sum sensing values sensed by four sensing elements and determine a sum of the sensing values as one pixel value. The controller may perform 2×2 binning for each sensing region by grouping sensing elements belonging to the same sensing region. In view of the performance of the 2×2 binning, a full resolution of an image obtained in the low illuminance level 1 420 may be reduced to 27 MP (=108 MP/4), in comparison to the high illuminance 410. A partial image for each sensing region may have a resolution of 6.75 MP (=27 MP/4).

In an example, the controller may determine the binning size to be "3×3" in the second low illuminance level 2 430. A full resolution of an image obtained by 3×3 binning may be 12 MP (=108 MP/9), and a partial image for each sensing region may have a resolution of 3 MP (=12 MP/4).

In an example, the controller may determine the binning size to be "4×4" in the third low illuminance level 3 440. A full resolution of an image obtained by 4×4 binning may be 6.75 MP (=108 MP/16), and a partial image for each sensing region may be 1.6875 MP (=6.75 MP/4).

Figure 5:
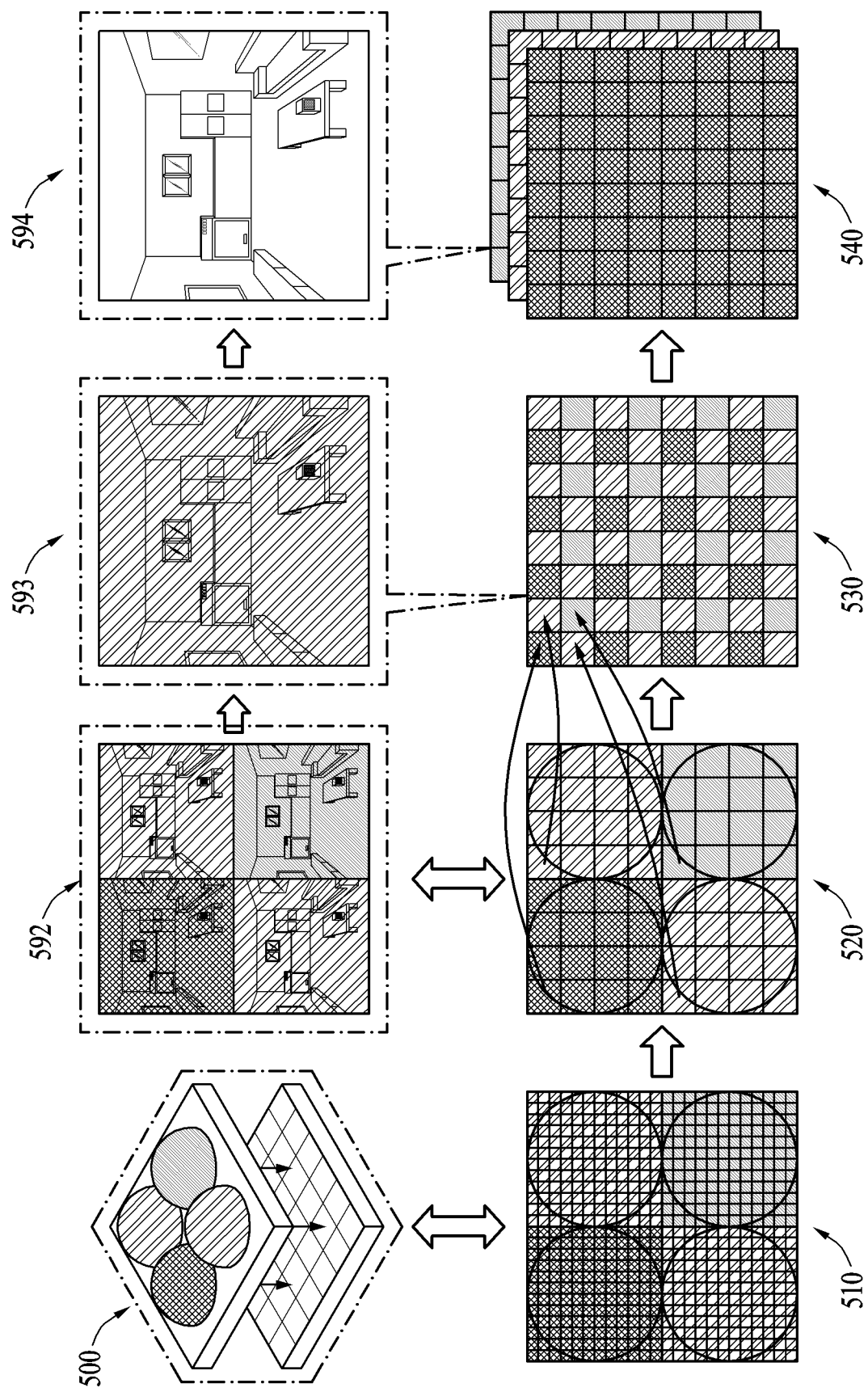
FIG. 5 illustrates an example image processing operation of an example image sensor, in accordance with one or more embodiments.

FIG. 5 illustrates an example image processing operation of an example image sensor, in accordance with one or more embodiments.

Referring to FIG. 5, an imaging device 500 and/or an image sensor 510 may determine a binning size based on an illuminance level, as described above with reference to FIG. 4. The imaging device 500 and/or the image sensor 510 may group sensing elements for each sensing region based on the determined binning size, and determine a pixel value based on sensing values sensed by the grouped sensing elements. In an example, the imaging device 500 and/or the image sensor 510 may determine a pixel value of a corresponding pixel from a sum of sensing values sensed by sensing elements grouped for one pixel. In an example, as described above, a sensing element disposed in one color sensing region may sense only light of a wavelength band corresponding to a single color by a color filter, and accordingly the imaging device 500 and/or the image sensor 510 may obtain a color intensity value corresponding to a single color for each pixel. Thus, a pixel value 520 that is obtained based on a binning process may indicate only a single color value. As illustrated in FIG. 5, the imaging device 500 and/or the image sensor 510 may obtain partial images 592 for each sensing region. Each of the partial images 592 may include color values of a color channel corresponding to a color sensing region for each pixel position.

In an example, a processor of the imaging device 500 and/or the image sensor 510 may rearrange pixel values sensed by sensing elements that receive light emitted from the same point or adjacent points on a subject, such that the pixel values may be disposed in pixel positions adjacent to each other. A rearrangement of pixel values may also be referred to as "registration." Rearranged pixel values 530 may form an intermediate image 593. In an example, the imaging device 500 and/or the image sensor 510 may rearrange pixel positions of pixels indicating the same point or adjacent points on a subject in a plurality of captured low-resolution images (e.g., color channel partial images 592) based on a correlation between light field information, to reconstruct a high-resolution image (e.g., a captured image).

The imaging device 500 and/or the image sensor 510 may generate pixel information of the intermediate image 593 by rearranging positions of pixels corresponding to sensing elements that receive similar light field information to be adjacent to each other. As described above, each sensing element may receive information of which a plurality of light fields overlap. If a total number of identical light fields included in information sensed by two sensing elements increases, a correlation between the information sensed by the two sensing elements may increase. A rearrangement of pixel positions may be performed based on a depth at which a corresponding pixel is captured. In an example, the depth at which the pixel is captured may be set to an arbitrary depth value, estimated through stereo image matching, or measured by a depth sensor. In another example, the pixel positions may also be rearranged by a neural network that rearranges the pixel positions based on a depth at which a subject is captured although the depth at which the pixel is captured is not measured and/or estimated. The above rearrangement of the pixel positions may be referred to as a "pixel shuffle." In an example, a machine learning model (e.g., a neural network) that is implemented to output a single high-resolution intermediate image 593 in response to an input of a plurality of low-resolution input images (e.g., the color channel partial images 592) may be used to rearrange pixel positions. A neural network may be trained based on a training data set obtained by capturing a subject at various depths. Since the intermediate image 593 may be an image in which pixels having only a single color value are rearranged, a pixel at each pixel position may have a single color value. In other words, the intermediate image 593 may be an image in which color values are mixed for each pixel position. However, the examples are not limited thereto.

The processor of the imaging device 500 and/or the image sensor 510 may generate a channel image with a target resolution from the rearranged pixel values 530. In an example, the imaging device 500 and/or the image sensor 510 may obtain the channel image with the target resolution from the rearranged pixel values 530 based on a machine learning model (e.g., a self-attention-based neural network), an interpolation scheme, and a filtering-based image processing scheme. An operation of obtaining a channel image from pixel values may also be referred to as "demosaicing."

In an example, if an image is a color image, the image may have color values that are based on a color system as pixel values, but it may be difficult for the image sensor 510 to simultaneously sense three colors at a single point due to a physical limitation. The imaging device 500 and/or the image sensor 510 may interpolate a color value (e.g., a red color value) that is not sensed by a sensing element (e.g., a sensing element with a front end in which a blue pass filtering element is disposed) in a predetermined position based on a color value that is sensed by a sensing element (e.g., a sensing element with a front end in which a red pass filtering element is disposed) located around the sensing element. In an example, the imaging device 500 and/or the image sensor 510 may perform the above-described interpolation on each of the rearranged pixel values 530. However, the examples are not limited thereto, and the image device 500 and/or the image sensor 510 may reconstruct the channel image based on a machine learning model (e.g., a neural network) that is implemented to output color images for each color channel in response to an input of the intermediate image 593 in which color values are mixed for each pixel position. In an example, the intermediate image 593 and channel images may have the same resolution (e.g., the full resolution). In another example, the imaging device 500 and/or the image sensor 510 may also reconstruct channel images 540 from the intermediate image 593 based on a filtering-based image processing scheme.

In the example illustrated in FIG. 5, the imaging device 500 and/or the image sensor 510 may obtain three color channel images for each color channel. A color channel image may have a target resolution (e.g., a full resolution). Thus, the imaging device 500 and/or the image sensor 510 may reconstruct a high-resolution image 594 (e.g., a captured image) including a plurality of color channel images 540. However, the above-described reconstruction of the channel images for each color channel is merely an example, and other methods may also be performed depending on a design.

Figure 6:
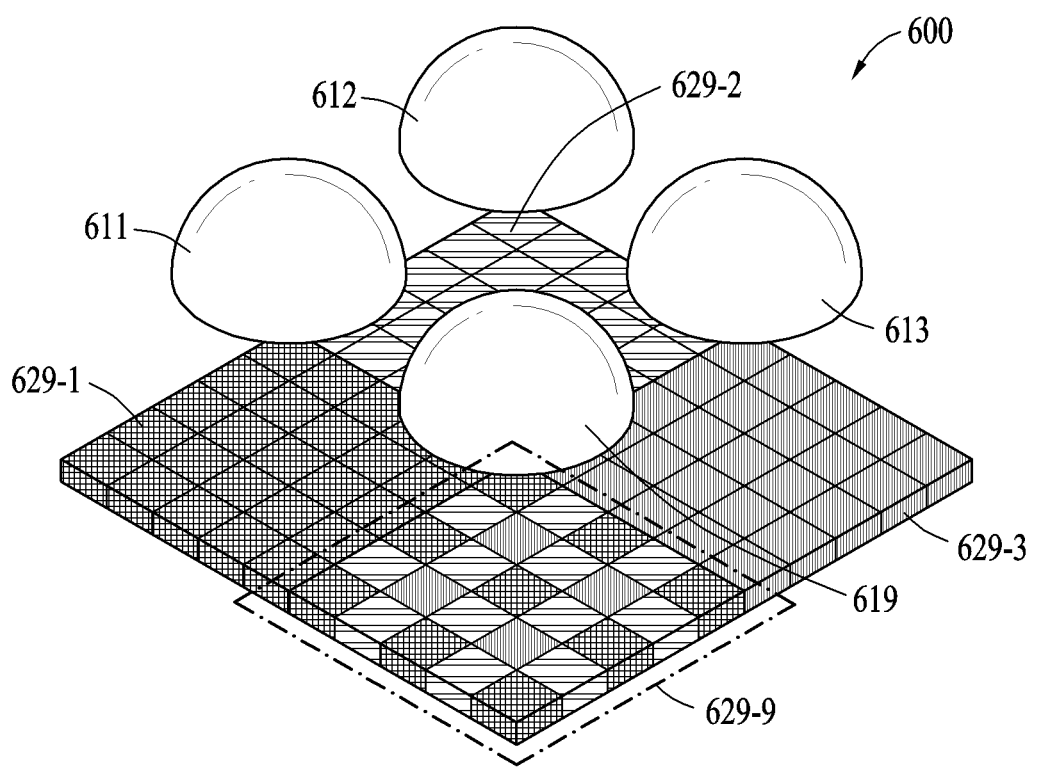
FIG. 6 illustrates an example structure of an example imaging device, in accordance with one or more embodiments.

FIG. 6 illustrates an example structure of an example imaging device, in accordance with one or more embodiments.

An imaging lens array may include an additional imaging lens 619 together with imaging lenses 611, 612, and 613 to sense a single color. The color filter array may further include an additional color filter. A pattern including one red pass filtering element, one blue pass filtering element, and two green pass filtering elements may be repeatedly disposed on the additional color filter. The above-described pattern may be, as a non-limited example, a Bayer pattern, but is not limited thereto. In an example, the sensing array may further include additional sensing elements. A plurality of additional sensing elements may be disposed in an additional sensing region 629-9 of the sensing array, and may sense light passing through the additional imaging lens 619 and the additional color filter. A controller may skip a binning operation for additional sensing elements. The controller may perform a binning operation on sensing elements disposed in the remaining color sensing region.

In an example, an imaging device 600 may provide a preview image via a display based on information sensed in the additional sensing region 629-9 having color filtering elements disposed in a Bayer pattern. When binning is being applied to sensing values collected in a color sensing region, the imaging device 600 may generate the preview image based on sensing values collected in the additional sensing region 629-9, independently of the binning of the color sensing region. The imaging device 600 may generate the preview image immediately by skipping image registration and/or image synthesis, and accordingly an amount of calculation for generating the preview image may be reduced. Thus, the imaging device 600 may minimize a delay in generating the preview image.

Additionally, a processor of the imaging device 600 and/or an image sensor may rearrange pixels sensed by other sensing elements (e.g., the first sensing elements, the second sensing elements, and the third sensing element) based on data sensed by the additional sensing elements. The imaging device 600 and/or the image sensor may obtain a Bayer pattern-based demosaicing image by performing demosaicing from pixel values obtained based on sensing of light passing through a color filtering element of a Bayer pattern. The imaging device 600 and/or the image sensor may rearrange pixel values obtained in another color sensing region (for example, rearrange pixel values sensed by the first sensing elements, the second sensing elements, and the third sensing elements in respective sensing regions 629-1, 629-2, and 629-3) based on the Bayer pattern-based demosaicing image. For example, the Bayer pattern-based demosaicing image may be obtained based on information collected in the additional sensing region 629-9. Information on an unsensible color may be lost in color sensing regions 629-1, 629-2, and 629-3. However, information on various colors may be collected in the additional sensing region 629-9. In the additional sensing region 629-9, a loss of the information on the various colors within a FoV range corresponding to the additional imaging lens 619 may be minimized. Thus, the imaging device 600 and/or the image sensor may perform more accurate registration in comparison to the example of FIG. 5.

In the image sensor, a first color (for example, red), a second color (for example, green), and a third color (for example, blue) are colors included in the same color system and may be different from each other. In an example, in the example of an RGB color system, the first color may be red, the second color may be green, and the third color may be blue. The sensing array may include at least one color sensing region for each color in a color system. In an example, in the RGB color system, the sensing array may include at least one sensing region for red, at least one sensing region for green, and at least one sensing region for blue. The image sensor may further include the above-described additional sensing region in addition to sensing regions for each color.

Additionally, a total number of sensing elements that sense green color in the sensing array may be greater than or equal to a total number of sensing elements that sense the other colors, for example, red and blue. In an example, a total number of sensing regions corresponding to green may be greater than or equal to a total number of sensing regions corresponding to blue or a total number of sensing regions corresponding to red. Since cone cells of a human eye may be the most sensitive to light of a green wavelength, the image sensor may also be implemented to sense a larger number of green components than the remaining color components. However, the examples are not limited thereto, and may vary depending on the implementation of such a color system.

Figure 7:
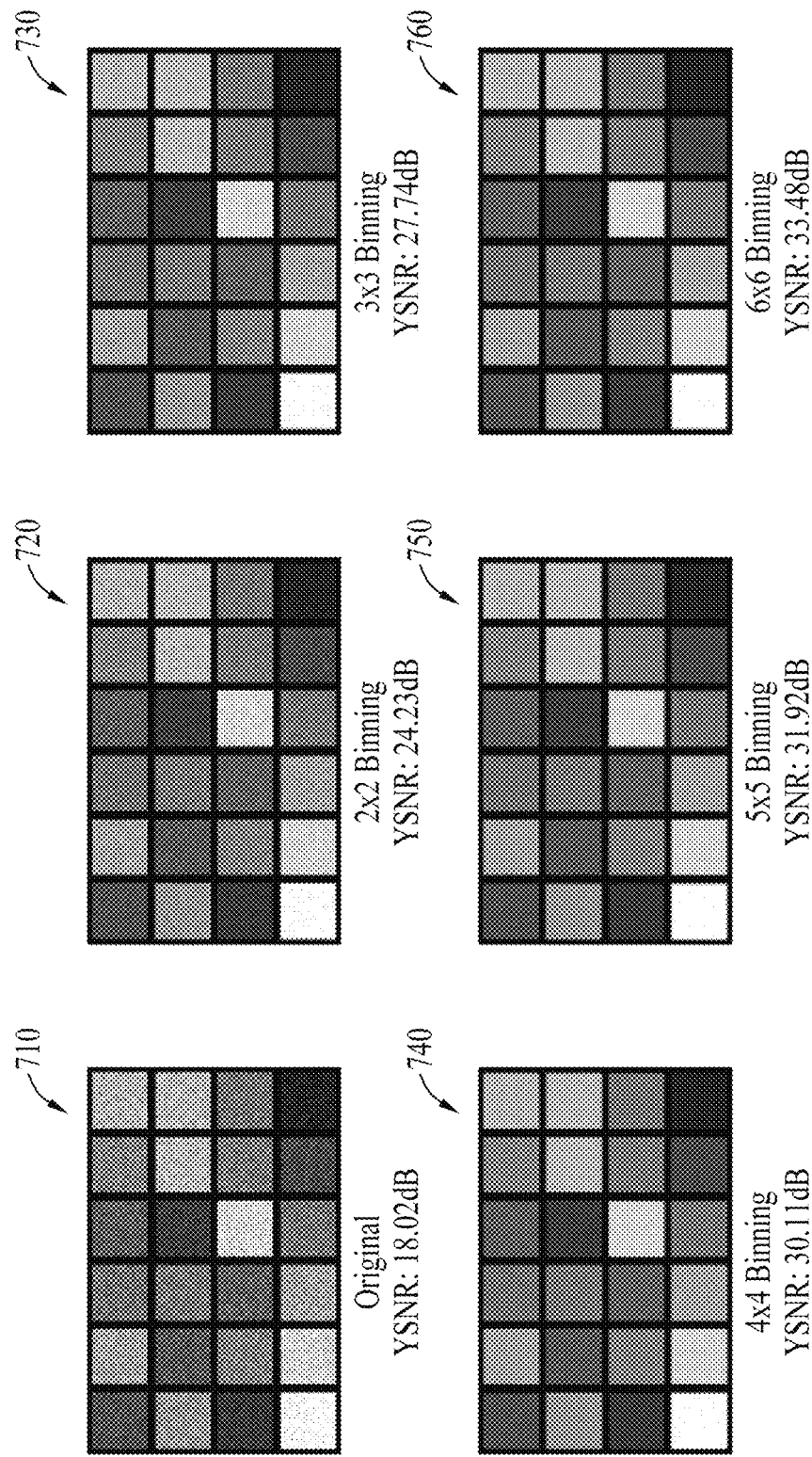
FIG. 7 illustrates an example of noise according to a binning level in an example image sensor and an example imaging device, in accordance with one or more embodiments.

FIG. 7 illustrates an example of noise according to a binning level in an example image sensor and an example imaging device, in accordance with one or more embodiments.

Noise related to an image received by the example imaging device and/or the example image sensor may be determined based on a binning level. FIG. 7 illustrates results of simulations with 1 lux of light for an image sensor having a pixel pitch of 1.4 µm. In an example, an image obtained for a 1×1 binning size may show noise with a luminance signal-to-noise ratio (YSNR) of 18.02 decibels (dB). An image received for a 2×2 binning size may show noise with a YSNR of 24.23 dB. An image received for a 3×3 binning size may show noise with a YSNR of 27.74 dB. An image received for a 4×4 binning size may show noise with a YSNR of 30.11 dB. An image received for a 5×5 binning size may show noise with a YSNR of 31.92 dB. An image received for a 6×6 binning size may show noise with a YSNR of 33.48 dB. If the binning size increases, the YSNR may increase. The imaging device and/or the image sensor may set a binning size based on a tradeoff between a resolution (e.g., a number of pixels) and a YSNR according to an illuminance condition.

Figure 8:
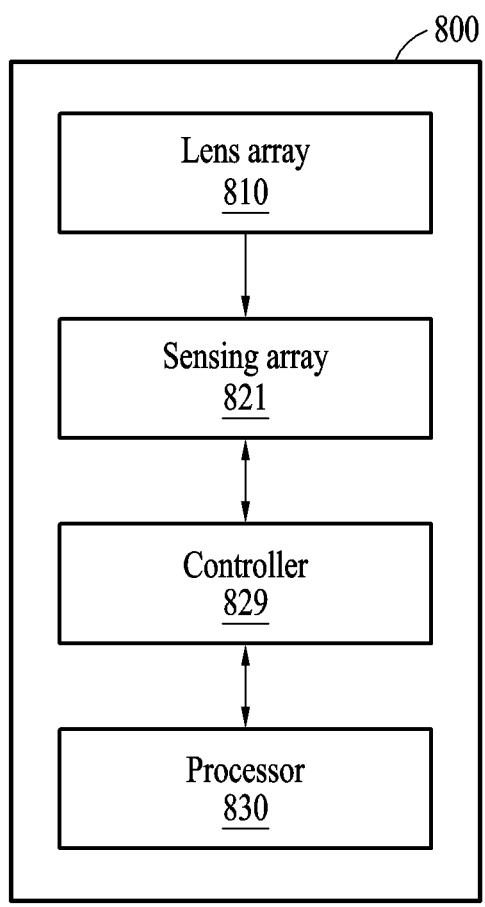
FIG. 8 illustrates an example configuration of an example imaging device, in accordance with one or more embodiments.

FIG. 8 illustrates an example configuration of an example imaging device, in accordance with one or more embodiments.

An example imaging device 800 may include a lens array 810 and an image sensor, which includes the sensing array 821, the controller 829, and the processor 830.

The lens array 810 may include imaging optical lenses that transfer light received from an external device.

The image sensor may be, as a non-limited example, a sensor that senses light passing through the lens array 810. The image sensor may include the sensing array 821, the controller 829, and the processor 830. The sensing array 821 and the controller 829 have been described above with reference to FIGS. 1 through 7, and accordingly further description thereof is not repeated herein.

The processor 830 may reconstruct an image based on sensing information sensed by sensing elements. The processor 830 of the image sensor may also be referred to as an "image signal processor (ISP)." Sensing information may also be used for depth estimation of a subject, refocusing, dynamic range imaging, and the capturing of a high-sensitivity image in a low-illuminance environment, as well as image reconstruction. In an example, although the processor 830 is included in the image sensor as described above with reference to FIG. 8, the examples are not limited thereto. In an example, the processor 830 may be included in the imaging device 800 separately from the image sensor.

Figure 9:
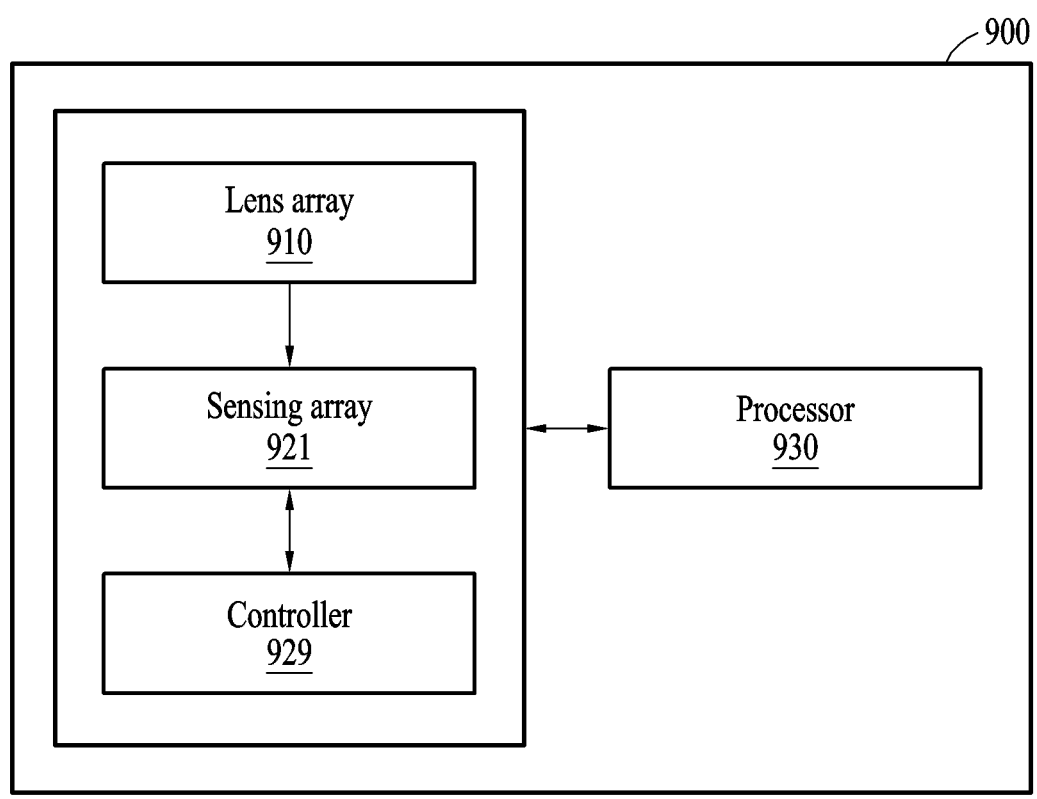
FIG. 9 illustrates an example configuration of an example electronic device, in accordance with one or more embodiments.

FIG. 9 illustrates an example configuration of an example electronic device, in accordance with one or more embodiments.

An example electronic device 900 may include an imaging module and a processor 930.

The imaging module may include a lens array 910 and an image sensor, and the image sensor may include a sensing array 921 and a controller 929. Although the processor 830 may be included in the image sensor as described above with reference to FIG. 8, in an example, the processor 930 of FIG. 9 may be independently positioned. The lens array 910, the image sensor, and the processor 930 have been described above, and accordingly further description thereof is not repeated herein. The processor 930 may be an application processor (AP).

Figure 10:
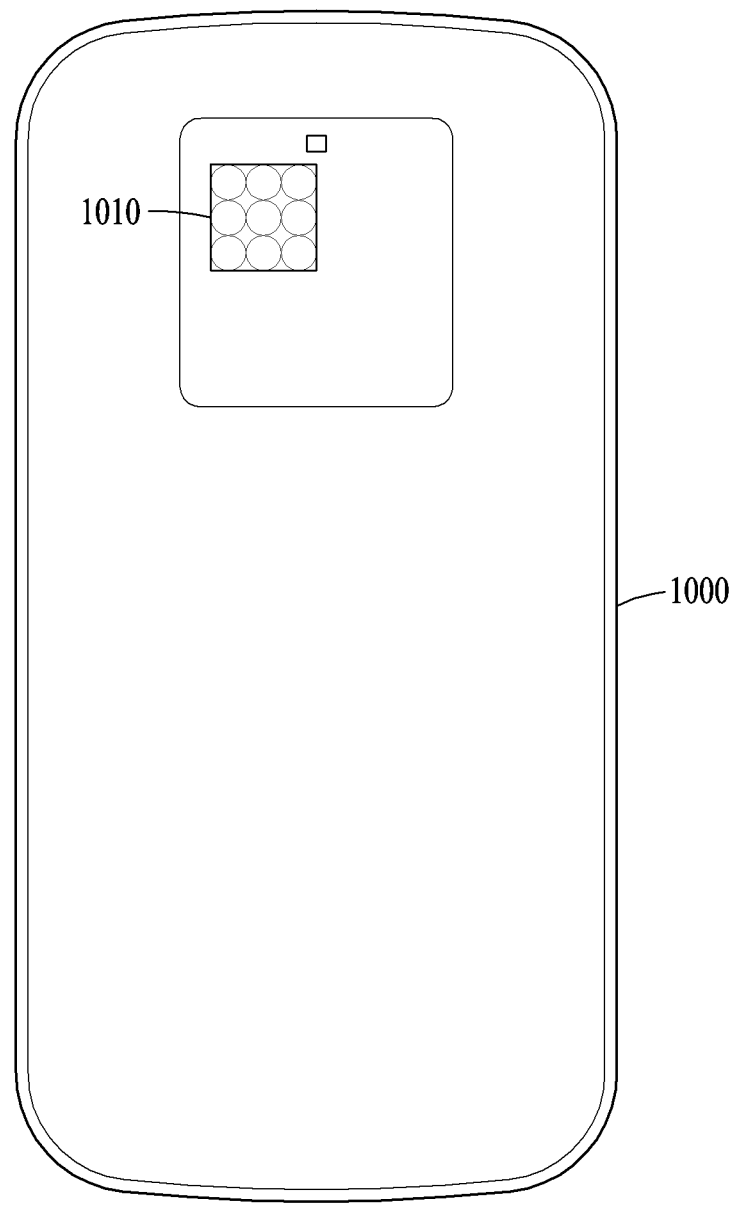
FIG. 10 illustrates an example device in which an image sensor is implemented, in accordance with one or more embodiments.
Figure 11:
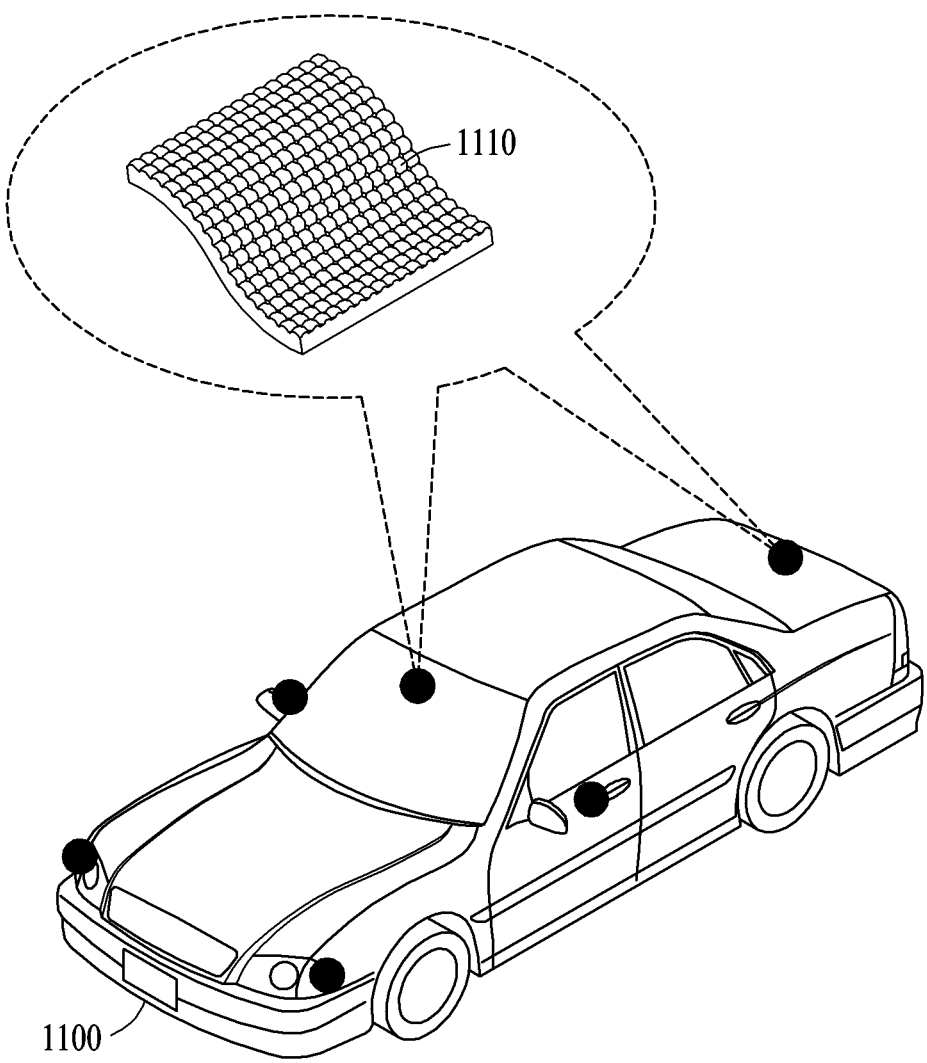
FIG. 11 illustrates an example vehicle in which an image sensor is implemented, in accordance with one or more embodiments.

FIGS. 10 and 11 illustrate example devices in which an example image sensor is implemented. FIG. 10 illustrates an example electronic device, e.g., a smartphone, as a non-limiting example. FIG. 11 illustrates an example vehicle including a plurality of image sensors representative of such a lens array, sensing array, controller, and processor, such as the lens array 910, sensing array 921, controller 929, and processor 930 of FIG. 9, as a noni-limiting example.

An image sensor and/or an imaging device may be applied to various technical fields. Since a lens array including a plurality of lenses and a sensor including a plurality of sensing elements may be implemented to be spaced apart by a relatively short focal length, the example imaging device may have a large sensor size and a thickness that enables high-quality capture can be implemented as an ultra-thin camera.

In a non-limiting example, the example image sensor and/or the example imaging device may be mounted on a mobile terminal. In an example, the mobile terminal may be a movable terminal that is not fixed at an arbitrary position, and may include, as non-limiting examples, a portable device, such as a smartphone, a tablet, or a foldable smartphone, an artificial intelligence speaker, a vehicle, and the like.

As illustrated in the example smartphone device of FIG. 10, an imaging module 1010 may be applied to a front camera or a rear camera of the smartphone. The imaging module 1010 may have a structure in which a large full-frame sensor and a multi-lens array are combined, and may be applied to a mobile phone camera.

Additionally, in an example, the imaging module 1010 may be implemented with thin structures or curved structures.

As illustrated in FIG. 11, the example vehicle includes a plurality of such imaging devices 1110, e.g., with a curved shape may be implemented as a front camera or a rear camera of the vehicle 1100.

Additionally, the electronic device with one or more of the imaging devices 1110 may be a digital single-lens reflex (DSLR) camera, a drone, a closed-circuit television (CCTV) camera, a webcam camera, a panoramic camera, a movie or broadcast video camera, and a virtual reality/augmented reality (VR/AR) camera, a flexible/stretchable camera, a compound-eye camera, and a contact lens type camera. Furthermore, the electronic device with one or more of the imaging devices 1110 may perform a multi-frame super-resolution image restoration to increase a resolution based on information on a plurality of captured frames.

The imaging device 800, lens array 810, sensing array 821, controller 820, processor 830 lens array, 910, sensing array, 921, controller 929, processor 930, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-11, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An imaging device, comprising:
an image sensor, comprising:
a color filter array comprising a first color filter configured to pass light of a first wavelength corresponding to a first color among light passing through a first imaging lens, a second color filter configured to pass light of a second wavelength corresponding to a second color among light passing through a second imaging lens, and a third color filter configured to pass light of a third wavelength corresponding to a third color among light passing through a third imaging lens;
a sensing array comprising first sensing elements disposed in a first color sensing region configured to receive light passing through the first color filter, second sensing elements disposed in a second color sensing region configured to receive light passing through the second color filter, and third sensing elements disposed in a third color sensing region configured to receive light passing through the third color filter; and
a controller configured to group the first sensing elements, the second sensing elements, and the third sensing elements based on a binning size determined based on an illuminance, and generate sensing data based on a sensing of the grouped first sensing elements, a sensing of the grouped second sensing elements, and a sensing of the grouped third sensing elements.

2. The imaging device of claim 1, further comprising a processor configured to reconstruct a captured image from the generated sensing data,
wherein the generated sensing data comprises sensing intensity values summed based on a binning for each pixel.

3. The imaging device of claim 2, wherein the processor is configured to rearrange pixel values sensed by sensing elements that receive light emitted from a same point or adjacent points on a subject to dispose the pixel values in pixel positions adjacent to each other.

4. The imaging device of claim 3, wherein the processor is further configured to generate a channel image with a target resolution from the rearranged pixel values.

5. The imaging device of claim 3, wherein the controller is further configured to determine each pixel value based on a sensing value sensed by an individual sensing element in response to the illuminance exceeding a threshold illuminance.

6. The imaging device of claim 1, wherein the controller is further configured to select one binning size from among three or more binning sizes based on the illuminance.

7. The imaging device of claim 1, wherein the controller is further configured to:
bin a first total number of sensing elements of the first sensing elements, the second sensing elements, and the third sensing elements in response to the illuminance being less than or equal to a first illuminance and exceeding a second illuminance; and
bin a second total number of sensing elements of the first sensing elements, the second sensing elements, and the third sensing elements greater than the first total number of sensing elements in response to the illuminance being less than or equal to the second illuminance.

8. The imaging device of claim 1, wherein sensing elements of the first sensing elements, the second sensing elements, and the third sensing elements greater than 50% of a plurality of sensing elements covered by each imaging lens are disposed to receive light of a wavelength corresponding to a same single color.

9. The imaging device of claim 1, wherein the first color, the second color, and the third color are comprised in a same color system, and are different from each other.

10. The imaging device of claim 1, wherein the sensing array comprises at least one color sensing region for each color of a color system.

11. The imaging device of claim 10, wherein the imaging device further comprises a plurality of imaging lenses in an image lens array, where the plurality of imaging lenses include the first imaging lens, the second imaging lens, and the third imaging lens.

12. The imaging device of claim 11, wherein the imaging device is a multi-lens camera.

13. A vehicle, comprising a plurality of the multi-lens cameras of claim 12.

14. The imaging device of claim 1, wherein a total number of sensing elements that sense green in the sensing array is greater than or equal to a total number of sensing elements in the sensing array that sense other colors.

15. The imaging device of claim 1, wherein:
the color filter array further comprises an additional color filter in which a pattern comprising one red pass filtering element, one blue pass filtering element, and two green pass filtering elements is repeatedly disposed, and
the sensing array further comprises a plurality of additional sensing elements corresponding to the additional color filter, and configured to sense light passing through an additional imaging lens and the additional color filter.

16. The imaging device of claim 15, wherein the pattern is a Bayer pattern.

17. The imaging device of claim 15, wherein the controller is further configured to skip a binning operation for each of the additional sensing elements.

18. The imaging device of claim 15, further comprising:
a processor configured to rearrange pixels sensed by the first sensing elements, the second sensing elements, and the third sensing elements based on data sensed by each of the plurality of additional sensing elements.

19. The imaging device of claim 1, wherein a total number of sensing regions corresponding to green is greater than or equal to a total number of sensing regions corresponding to blue or a total number of sensing regions corresponding to red.

20. The imaging device of claim 1, further comprising:
an illuminance sensor configured to measure the illuminance.

21. An imaging device, comprising:
an imaging lens array comprising a first imaging lens, a second imaging lens, and a third imaging lens;
a color filter array comprising a first color filter configured to pass light of a first wavelength corresponding to a first color among light passing through the first imaging lens, a second color filter configured to pass light of a second wavelength corresponding to a second color among light passing through the second imaging lens, and a third color filter configured to pass light of a third wavelength corresponding to a third color among light passing through the third imaging lens;
a sensing array comprising first sensing elements disposed in a first color sensing region configured to receive light passing through the first color filter, second sensing elements disposed in a second color sensing region configured to receive light passing through the second color filter, and third sensing elements disposed in a third color sensing region configured to receive light passing through the third color filter; and a controller configured to group the first sensing elements, the second sensing elements, and the third sensing elements based on a binning size determined based on an illuminance, and generate sensing data based on a sensing of the grouped first sensing elements, a sensing of the grouped second sensing elements, and a sensing of the grouped third sensing elements.

22. A method comprising:

sensing, by an image sensor, light passing through a color filter and an imaging lens corresponding to the color filter by sensing elements, of a sensing array, disposed in a sensing region for respective color channels, wherein the sensing elements of the sensing array comprises first sensing elements disposed in a first color sensing region, second sensing elements disposed in a second color sensing region and third sensing elements disposed in a third color sensing region; and generating sensing data based on a grouping of color intensity values sensed by the sensing elements for each sensing region based on a binning size determined based on an illuminance of light, including grouping the first sensing elements, the second sensing elements, and the third sensing elements based on the binning size.

23. A non-transitory computer-readable storage medium storing instructions that, when executed by a processor, cause the processor to perform the method of claim 22.

24. A multi-lens camera, comprising:

a plurality of imaging lens;

an optical filter comprising a plurality of color filters, each configured to receive light passing through a corresponding imaging lens, and transmit light corresponding to a single color;

a sensing array comprising first sensing elements disposed in a first color sensing region, second sensing elements disposed in a second color sensing region and third sensing elements disposed in a third color sensing region, and the sensing array configured to generate sensing information based on the light passing through the imaging lens, and a controller configured to determine an illuminance level of a capturing environment based on the light passing through the imaging lens, and select a binning size corresponding to the determined illuminance level from among a plurality of binning sizes, group the first sensing elements, the second sensing elements, and the third sensing elements based on the selected binning size and reconstruct a captured image based on the sensing information.

25. The camera of claim 24, wherein the sensing information comprises at least one of intensity information and color intensity values.

26. The camera of claim 24, wherein the illuminance level of the capturing environment is determined from at least one of a high illuminance, a first low illuminance level, a second low illuminance level, and a third low illuminance level.

* * * * *